United States Patent Office 3,344,857
Patented Oct. 3, 1967

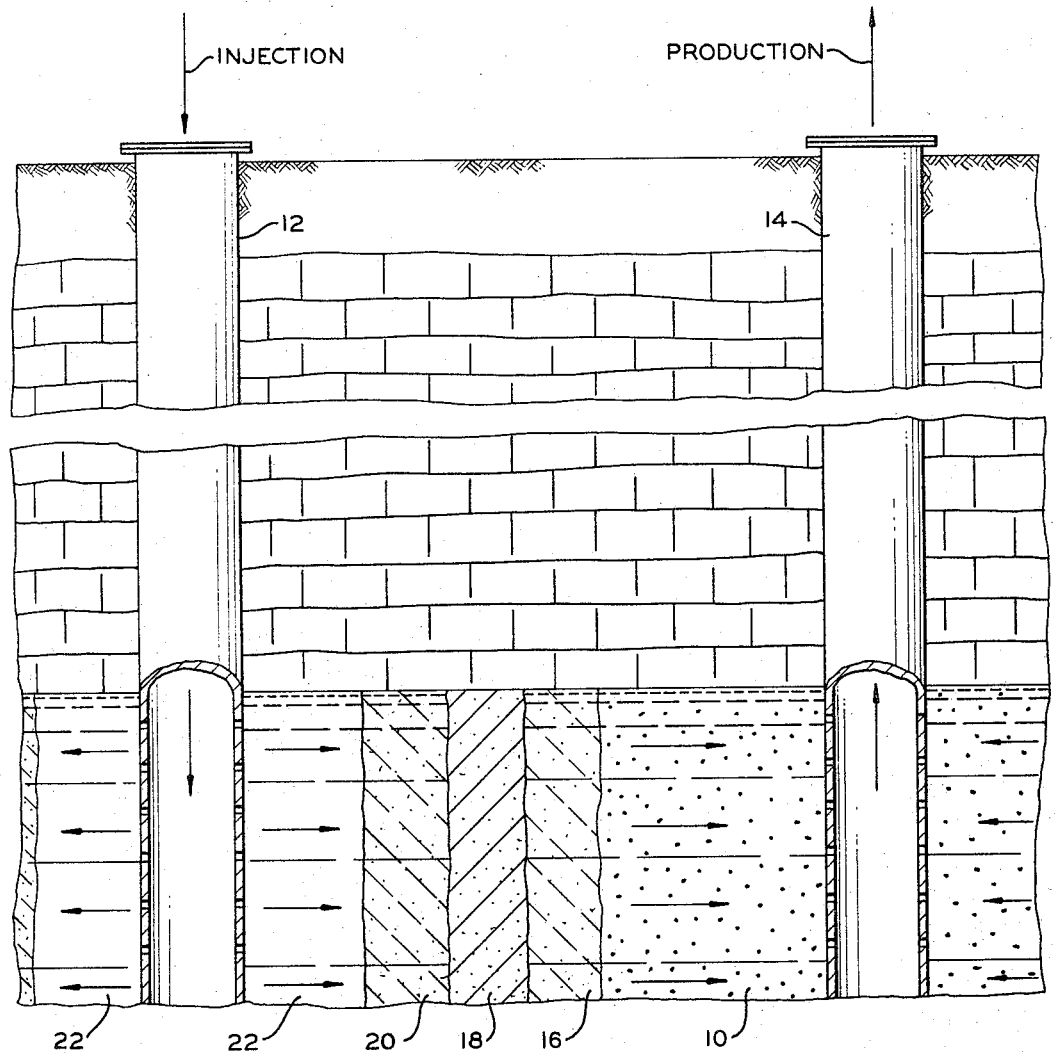

3,344,857
FLUID DRIVE PRODUCTION OF OIL
Ralph E. Gilchrist, Bartlesville, Okla., assignor to Phillips Petroleum Company, a corporation of Delaware
Filed Mar. 8, 1965, Ser. No. 437,994
7 Claims. (Cl. 166—9)

ABSTRACT OF THE DISCLOSURE

Recovery of oil by fluid drive thru an oil stratum using $CO_2$ as displacing aid is improved by injecting slugs of aqueous surfactant ahead of and behind a slug of $CO_2$ to decrease the solubility of the $CO_2$ in the aqueous slugs thereby preserving more of the $CO_2$ for oil displacement.

---

This invention relates to an improved process for producing oil from an oil-bearing stratum by fluid drive with $CO_2$ in the driving fluid.

Fluid drive displacement of oil from an oil-bearing stratum utilizing $CO_2$ in the driving fluid is a conventional technique in oil production. One of the major drawbacks or disadvantages in the use of $CO_2$ in such a displacement process is the non-essential consumption or loss of $CO_2$ in the stratum. In spite of the fact that $CO_2$ dissolves more readily in crude oil than in water, certain substantial proportions of the $CO_2$ gas injected into the stratum dissolve in the connate water and are ineffective in the process. From a cost or economical point of view, this means that some of the expensive $CO_2$ injected into the stratum is being used for other than the recovery of oil.

Prior to this time it has been considered desirable to dissolve the $CO_2$ in the driving water, with the addition of a surfactant to the water to modify the water so that it would dissolve more $CO_2$. (See U.S. Patent 2,875,831, issued to Martin et al.) Also, it has been considered that the surfactant in such a system lowers the interfacial tension between the stratum surfaces and oil which clings thereto.

It has been demonstrated in the laboratory that if a small discrete slug of gaseous $CO_2$ is injected directly into the oil-bearing stratum and then chased with water, a more effective utilization of the $CO_2$ is accomplished than when the $CO_2$ is dissolved in the driving water prior to the injection.

Accordingly, an object of the invention is to provide an improved process for producing oil by fluid drive utilizing gaseous $CO_2$ in the driving fluid. Another object is to provide a process which more effectively utilizes $CO_2$ in the driving fluid when producing oil by fluid drive. Other objects of the invention will become apparent to one skilled in the art upon consideration of the accompanying disclosure.

A broad aspect of the invention comprises sequentially injecting in the order named into an oil-bearing stratum, a first slug or bank of an aqueous solution of selected surfactant which decreases the solubility of $CO_2$ in the water thru an injection well, a second slug or bank of gaseous $CO_2$, and a third slug or bank of aqueous solution of the selected surfactant, and then driving the injected slugs or banks thru the stratum to a production well by fluid drive so as to displace oil into the production well, and thereafter producing the displaced oil from the production well.

The surfactant used must decrease the solubility of $CO_2$ in the solution. Most surfactants have the opposite effect. The higher alkyl sulfates, such as lauryl sulfates, including sodium lauryl sulfate, are effective in this invention. Compounds of the formula $ROSO_2OM$ wherein R is an alkyl radical of 8 to 24 carbon atoms and M is an alkali metal are effective in aqueous solution in reducing $CO_2$ solubility therein. The alkyl radical may be branched or straight chain. The preferred alkyl radicals are those of 10 to 18 carbon atoms. Higher alkyl sulfates are commercially available under various trade names such as "Gardinols," "Duponals," "Orvus," "Maprofix," "Mapromol," "Stepanols," "Sipex," "Sipon," "Lissapol C," "Syntapone L," "Syntapone CP," etc. The foregoing products are normal primary alcohol sulfates (esters of higher alcohols). The secondary alcohol sulfates made by sulfating olefins or synthetic alcohols derived from butyraldehyde are also effective. These include "Teepol," "Lensex," "Tergitol 08," "Tergitol 7," etc.

The concentration of the selected surfactant in the injected solution is in the range of 0.0001 to 10 weight percent of the solution and the amount of the slug or bank is in the range of 0.1 to 10 percent of the hydrocarbon pore volume. The slug or bank of gaseous $CO_2$ has a volume under standard conditions of temperature and pressure in the range of 0.1 to 10 pore volumes.

It has been discovered that there is substantially less loss of $CO_2$ in the water or aqueous phase at the interfaces of the $CO_2$ and aqueous phase when the aqueous phase contains small concentrations of the selected surface active agents or surfactants. Small concentrations of these surfactants in the range of 0.0001 to 10, preferably .001 to .01 weight percent, and more desirably 0.1 to 1.0 weight percent, reduce the adsorption coefficient for the adsorption of $CO_2$ in $H_2O$ as much as 50 percent. Thus the invention minimizes the loss of free gaseous $CO_2$ by absorption in the forward and rearward banks of aqueous solution and also in any connate water in the stratum and makes available a larger percentage of the $CO_2$ for adsorption in and swelling of the oil in the pores of the stratum. Connate water is exchanged with solution to incorporate surfactant therein and reduce its solubility for $CO_2$.

The improvements of the fluid drive process comprise injecting a slug of water containing the surfactant previous to the injection of $CO_2$ and also following the injection of the slug of $CO_2$. Sufficient aqueous solution of the surfactant is injected to form a bank of the injected solution of substantial thickness occupying the complete vertical cross section of the stratum to be produced so that in driving the slug or bank radially outwardly from the injection well, the slug or bank does not lose continuity in the stratum as it spreads out in moving into the expanded sweep area. In this manner, the loss of $CO_2$ to the bordering aqueous bank and to connate water present is minimized so that a greater proportion of the $CO_2$ is available for adsorption in the reservoir oil.

The several banks or slugs of injected fluids are then driven thru the stratum to one or more production wells by injecting a suitable driving fluid which may comprise water (without added surfactant) or a suitable driving gas such as air, combustion gas, nitrogen or any other conventional driving gas. Water is the preferred driving fluid for moving the slugs or banks thru the stratum.

The technique of the invention is applicable to any conventional well pattern including spot patterns in which a central well is surrounded by a number of production wells. It is also feasible to apply the fluid drive process of the invention to in-line drive between parallel rows of wells.

Besides the usual advantages to be gained by the use of surfactants in displacement processes, the injection of surfactant treated water in accordance with the invention prior to injection of the $CO_2$ gaseous slug aids the more complete absorption of $CO_2$ in the oil, resulting in more oil being produced per unit of $CO_2$ injected.

A more complete understanding of the invention may be had by reference to the accompanying schematic drawing which shows a broken section thru a pair of wells in an oil-bearing stratum and illustrating the sequential arrangement of the injected slugs or banks of driving fluids.

Referring to the drawing, an oil-bearing stratum 10 is penetrated by an injection well 12 and a production well 14. These wells are equipped with conventional casing, tubing, injection, and production equipment (not shown). Shown in stratum 10, which contains oil and connate water, are a first slug or bank of aqueous solution of selected surfactant 16, a second slug or bank of gaseous $CO_2$ 18, a third slug or bank of aqueous solution of surfactant 20, and a driving fluid comprising water 22. The various slugs are injected in conventional manner thru well tubing, with or without the use of packers, and the successive banks of fluid are displaced by the aqueous driving fluid injected after the establishment of the first three banks of fluid in the stratum. Upon movement of the several banks of fluid thru the stratum toward the production well, oil absorbs $CO_2$ from the gaseous bank of $CO_2$ and is more readily displaced from the stratum because of its decreased viscosity and also because of the dislodging and displacing effect of the surfactant. In this operation, the lower solubility of $CO_2$ in the solution of surfactant increases the proportion of the $CO_2$ available for absorption in the in-place oil and contributes materially to the improved efficiency of the driving process.

It is to be understood that well 12 may be either a central injection well within a ring of production wells 14, or a line of injection wells extending between parallel lines of wells 14 so that the drive of fluid is in both lateral directions away from wells 12 toward the two lines of wells 14. Any suitable pressures on the injection and production wells, with suitable differential pressure for the fluid drive, may be utilized.

Certain modifications of the invention will become apparent to those skilled in the art and the illustrative details disclosed are not to be construed as imposing unnecessary limitations on the invention.

I claim:
1. A process for producing oil from an oil-bearing stratum penetrated by an injection well and a production well comprising the steps of:
 (a) injecting into said stratum thru said injection well in the following sequence:
  (1) a bank of aqueous solution of surfactant which decreases the solubility of $CO_2$ therein as compared to pure water, the concentration of surfactant being in the range of 0.0001 to 10 weight percent;
  (2) a bank of gaseous $CO_2$; and
  (3) a second bank of the aqueous solution of (1);
 (b) driving the injected banks thru said stratum toward said production well by fluid drive so as to displace oil thereinto; and
 (c) producing the oil displaced in step (b) from said production well.
2. The process of claim 1 wherein the banks of (1) and (3) have a volume in the range of 0.1 to 10 percent of the hydrocarbon pore volume and the bank of (2) has a volume under standard conditions of temperature and pressure in the range of 0.1 to 10 pore volumes.
3. The process of claim 1 wherein the driving fluid in step (b) is aqueous.
4. The process of claim 1 wherein the driving fluid in step (b) is gaseous.
5. A process for producing oil from an oil-bearing stratum containing connate water and penetrated by an injection well and a production well comprising the steps of:
 (a) injecting into said stratum thru said injection well in the following sequence:
  (1) a bank of aqueous solution of a surfactant having the formula $ROSO_2OM$ wherein R is an alkyl radical of 8 to 24 carbon atoms and M is an alkali metal in a concentration in the range of 0.0001 to 10 weight percent;
  (2) a bank of $CO_2$ in an amount in the range of 0.1 to 10 pore volumes under standard conditions of temperature and pressure; and
  (3) a second bank of aqueous solution of (1), said surfactant substantially reducing the absorption of $CO_2$ from the bank of (2) by said connate water so as to increase the proportion of $CO_2$ available for solution in stratum oil;
 (b) driving the injected banks thru said stratum toward said production well by fluid drive so as to displace oil thereinto; and
 (c) producing the oil displaced in step (b) from said production well.
6. The process of clam 5 wherein the banks of (1) and (3) have a volume in the range of 0.1 to 10 percent of the hydrocarbon pore volume.
7. The process of claim 5 wherein said surfactant is sodium lauryl sulfate.

References Cited
UNITED STATES PATENTS

| | | | |
|---|---|---|---|
| 3,084,743 | 4/1963 | West et al. | 166—9 |
| 3,103,972 | 9/1963 | Parker | 166—9 |
| 3,185,634 | 5/1965 | Craig et al. | 166—9 |
| 3,207,217 | 9/1965 | Woertz | 166—9 |
| 3,227,210 | 1/1966 | Trantham | 166—9 |
| 3,249,157 | 5/1966 | Brigham et al. | 166—9 |

OTHER REFERENCES

Cullen, E. J., et al.: The effect of surface active agents on the rate of absorption of carbon dioxide by water. In Chem. Eng. Sci. 6(2): pp. 49–56 November 1956, TP 1.C381.

CHARLES E. O'CONNELL, *Primary Examiner.*

I. A. CALVERT, *Assistant Examiner.*